US012670370B1

(12) United States Patent
Matveev et al.

(10) Patent No.: US 12,670,370 B1
(45) Date of Patent: Jun. 30, 2026

(54) SYSTEMS AND METHODS FOR ACTIVATION SPARSE AND KERNEL SPARSE GENERAL MATRIX MULTIPLICATION IN NEURAL NETWORKS

(71) Applicant: Red Hat, Inc., Raleigh, NC (US)

(72) Inventors: Alexander Matveev, Cambridge, MA (US); Nir Shavit, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 1142 days.

(21) Appl. No.: 17/237,370

(22) Filed: Apr. 22, 2021

Related U.S. Application Data

(60) Provisional application No. 63/013,703, filed on Apr. 22, 2020.

(51) Int. Cl.
| | |
|---|---|
| *G06F 16/901* | (2019.01) |
| *G06F 7/523* | (2006.01) |
| *G06F 7/78* | (2006.01) |
| *G06F 9/445* | (2018.01) |
| *G06N 3/063* | (2023.01) |

(52) U.S. Cl.
CPC ............. *G06N 3/063* (2013.01); *G06F 7/523* (2013.01); *G06F 7/78* (2013.01); *G06F 9/445* (2013.01)

(58) Field of Classification Search
CPC ........... G06N 3/063; G06F 7/523; G06F 7/78; G06F 9/445
See application file for complete search history.

(56) References Cited

U.S. PATENT DOCUMENTS

| | | | |
|---|---|---|---|
| 5,577,166 | A | 11/1996 | Mizuno |
| 7,747,070 | B2 | 6/2010 | Puri |
| 9,558,156 | B1 | 1/2017 | Bekas et al. |
| 9,811,775 | B2 | 11/2017 | Krizhevsky et al. |
| 9,818,059 | B1 | 11/2017 | Woo et al. |
| 10,157,045 | B2 | 12/2018 | Venkataramani et al. |
| 10,223,333 | B2 | 3/2019 | Chetlur et al. |
| 10,572,568 | B2 | 2/2020 | Narayanamoorthy et al. |
| 10,685,082 | B2 | 6/2020 | Bekas et al. |
| 10,719,323 | B2 | 7/2020 | Baum et al. |
| 10,832,139 | B2 | 11/2020 | Yan et al. |

(Continued)

FOREIGN PATENT DOCUMENTS

| | | | | |
|---|---|---|---|---|
| CN | 107145939 | A * | 9/2017 | ......... G06F 12/0207 |
| CN | 107832839 | | 3/2018 | |

(Continued)

OTHER PUBLICATIONS

Deshpande, A beginner's guide to understanding convolutional neural networks, Jul. 20, 2016.

(Continued)

*Primary Examiner* — Hassan Mrabi
(74) *Attorney, Agent, or Firm* — Kilpatrick Townsend & Stockton LLP

(57) ABSTRACT
A system and method for performing multiplication for a neural network, e.g. for data of one or more layers in a neural network, may include loading a portion of a compressed version of a sparse input matrix into a cache memory; uncompressing a subset of the data in the portion of the compressed version of the sparse input matrix; and multiplying a sparse kernel matrix by the subset of the data using a set of instructions which are themselves created based on the sparse kernel matrix.

13 Claims, 3 Drawing Sheets

(56) References Cited

U.S. PATENT DOCUMENTS

| | | | |
|---|---|---|---|
| 10,970,619 B1 | 4/2021 | Xiao et al. | |
| 11,113,601 B1 | 9/2021 | Xiao et al. | |
| 11,216,732 B2 | 1/2022 | Zlateski et al. | |
| 2010/0076915 A1 | 3/2010 | Xu et al. | |
| 2011/0119467 A1 | 5/2011 | Cadambi et al. | |
| 2011/0296146 A1 | 12/2011 | Anand et al. | |
| 2012/0311299 A1 | 12/2012 | Blumrich et al. | |
| 2013/0138589 A1 | 5/2013 | Yu et al. | |
| 2015/0127327 A1 | 5/2015 | Bacchiani et al. | |
| 2016/0224465 A1 | 8/2016 | Morad et al. | |
| 2016/0239706 A1 | 8/2016 | Dijkman et al. | |
| 2016/0328643 A1 | 11/2016 | Liu et al. | |
| 2016/0350645 A1 | 12/2016 | Brothers et al. | |
| 2016/0358070 A1 | 12/2016 | Brothers et al. | |
| 2016/0379109 A1 | 12/2016 | Chung et al. | |
| 2017/0032487 A1 | 2/2017 | Ashari et al. | |
| 2017/0103313 A1 | 4/2017 | Ross et al. | |
| 2017/0103317 A1 | 4/2017 | Young | |
| 2017/0132496 A1 | 5/2017 | Shoaib et al. | |
| 2017/0169567 A1 | 6/2017 | Chefd'Hotel et al. | |
| 2017/0193136 A1 | 7/2017 | Prasad et al. | |
| 2017/0193361 A1 | 7/2017 | Chilimbi et al. | |
| 2017/0200094 A1 | 7/2017 | Bruestle et al. | |
| 2017/0220524 A1 | 8/2017 | Herrero Abellanas et al. | |
| 2017/0316311 A1 | 11/2017 | Pilly et al. | |
| 2017/0316312 A1 | 11/2017 | Goyal et al. | |
| 2017/0372202 A1 | 12/2017 | Ginsburg et al. | |
| 2018/0046900 A1 | 2/2018 | Dally et al. | |
| 2018/0096226 A1 | 4/2018 | Aliabadi et al. | |
| 2018/0173571 A1 | 6/2018 | Huang et al. | |
| 2018/0253402 A1 | 9/2018 | Redfern et al. | |
| 2018/0315159 A1 | 11/2018 | Ould-Ahmed-Vall et al. | |
| 2018/0322390 A1 | 11/2018 | Das et al. | |
| 2018/0336468 A1 | 11/2018 | Kadav et al. | |
| 2019/0042250 A1 | 2/2019 | Anders et al. | |
| 2019/0042542 A1 | 2/2019 | Narayanamoorthy et al. | |
| 2019/0056916 A1 | 2/2019 | Varma et al. | |
| 2019/0138902 A1 | 5/2019 | Matveev et al. | |
| 2019/0156206 A1 | 5/2019 | Graham et al. | |
| 2019/0156214 A1 | 5/2019 | Matveev et al. | |
| 2019/0156215 A1 | 5/2019 | Matveev et al. | |
| 2019/0179818 A1 | 6/2019 | Lee | |
| 2019/0205759 A1 | 7/2019 | Zhang | |
| 2019/0212982 A1 | 7/2019 | Yoda et al. | |
| 2019/0303743 A1 | 10/2019 | Venkataramani et al. | |
| 2019/0354894 A1 | 11/2019 | Lazovich et al. | |
| 2019/0370071 A1 | 12/2019 | Matveev et al. | |
| 2019/0370644 A1 | 12/2019 | Kenney et al. | |
| 2020/0034710 A1 | 1/2020 | Sidhu et al. | |
| 2020/0089534 A1 | 3/2020 | Chen et al. | |
| 2020/0090024 A1 | 3/2020 | Chen et al. | |
| 2020/0097826 A1 | 3/2020 | Du et al. | |
| 2020/0104717 A1 | 4/2020 | Alistarh | |
| 2020/0117999 A1 | 4/2020 | Yoon et al. | |
| 2020/0160181 A1 | 5/2020 | Zlateski et al. | |
| 2020/0160182 A1 | 5/2020 | Matveev et al. | |
| 2020/0190808 A1* | 6/2020 | Joydeep | G06N 3/063 |
| 2020/0193274 A1 | 6/2020 | Darvish Rouhani et al. | |
| 2020/0218978 A1 | 7/2020 | Kopinsky | |
| 2020/0320400 A1 | 10/2020 | David | |
| 2020/0342301 A1 | 10/2020 | Miao et al. | |
| 2021/0027197 A1 | 1/2021 | Foerster et al. | |
| 2021/0049463 A1 | 2/2021 | Ruff | |
| 2021/0174190 A1 | 6/2021 | Janssen et al. | |
| 2023/0316058 A1* | 10/2023 | Nurvitadhi | G06N 3/045 706/15 |

FOREIGN PATENT DOCUMENTS

| | | | | | |
|---|---|---|---|---|---|
| CN | 109993297 A | * | 7/2019 | | G06N 3/082 |
| CN | 111353591 B | * | 8/2024 | | G06N 3/063 |
| CN | 111382835 B | * | 8/2024 | | G06N 3/044 |
| CN | 111382848 B | * | 8/2024 | | G06N 3/044 |
| EP | 3 037 980 | | 6/2016 | | |
| EP | 3779681 B1 | * | 4/2024 | | G06F 17/16 |
| TW | 1786255 B | * | 12/2022 | | G06N 3/045 |
| WO | WO 2017/049496 | | 3/2017 | | |
| WO | WO 2018/053835 | | 3/2018 | | |
| WO | WO 2019/090325 A1 | | 5/2019 | | |
| WO | WO-2020046859 A1 | * | 3/2020 | | G06F 17/16 |
| WO | WO 2020047823 A1 | | 3/2020 | | |
| WO | WO 2020/072274 A1 | | 4/2020 | | |
| WO | WO-2020190772 A1 | * | 9/2020 | | G06N 3/063 |
| WO | WO-2020190808 A1 | * | 9/2020 | | G06F 12/0806 |

OTHER PUBLICATIONS

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015.

Lavin et al., "Fast Algorithms for Convolutional Neural Networks", Nov. 10, 2015.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017.

Rusu et al., "Progressive Neural Networks", Sep. 7, 2016.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.

Georganas et al., "Anatomy Of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567 .pdf entire document.

Kaya et al., "Scalable sparse tensor decompositions in distributed memory systems", SC'15: Proceedings of the International Conference for High Performance Computing, Networking, Storage and Analysis, IEEE, 2015. (Year: 2015).

Kim et al., "Designing Vector-Friendly Compact BLAS and LAPACK Kernels", SC17, Nov. 12-17, 2017, Denver, CO, USA.

Lascorz et al., "Bit-Tactical: Exploiting Ineffectual Computations in Convolutional Neural Networks: Which, Why, and How", Mar. 9, 2018.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.

Papyan et al., "Convolutional neural networks analyzed via convolutional sparse coding." In: The Journal of Machine Learning Research. Jul. 17, 2017 (Jul. 17, 2017) Retrieved on Feb. 20, 2020.

Scardapane et al. "Group sparse regularization for deep neural networks.", In: Neurocomputing. Jul. 2, 2016 (Jul. 2, 2016) Retrieved on Nov. 16, 2019 (Nov. 16, 2019).

Smith et al., "SPLATT: Efficient and parallel sparse tensor-matrix multiplication", 2015 IEEE International Parallel and Distributed Processing Symposium, IEEE, 2015, (Year: 2015).

Wozniak et al., "GiMMiK-Generating bespoke matrix multiplication kernels for accelerators: Application to high-order Computational Fluid Dynamics", Computer Physics Communications, vol. 202, 2016, pp. 12-22.

(56)       References Cited

OTHER PUBLICATIONS

Zhangxiaowen Gong et al. "Sparse Train: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).

Kurtz, Mark, et al. "Inducing and Exploiting Activation Sparsity for Fast Neural Network Inference." Proceedings of the International Conference on Machine Learning. 2020.

Robert Lim; "Methods for Accelerating Machine Learning in High Performance Computing"; University of Oregon—AREA—Jan. 2019.

Zhizhou Li et al.; "A CPU-based Algorithm for Traffic Optimization Based on Sparse Convolutional Neural Networks"; 2017 IEEE 30th Canadian Conference on Electrical and Computer (CCECE).

Baoyuan Liu et al.; "Sparse Convolutional Neural Networks"; CVPR 2015—Computer Vision Foundation—IEEE.

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.

Israt Nisa et al.; "Sampled Dense Matrix Multiplication for High-Performance Machine Learning"; 2018 IEEE 25th International Conference on High Performance Computing (Hi PC).

Yang, Huanrui, Wei Wen, and Hai Li. "Deephoyer: Learning sparser neural network with differentiable scale-invariant sparsity measures." arXiv preprint arXiv:1908.09979 (2019).

Yuster, Raphael, and Uri Zwick. "Fast sparse matrix multiplication." ACM Transactions On Algorithms (TALG) 1.1 (2005): 2-13.

Paixao, Crysttian A., and Flávio Codeço Coelho. Matrix compression methods. No. e1049. PeerJ PrePrints, 2015.

Park, Jongsoo, et al. "Faster cnns with direct sparse convolutions and guided pruning." arXiv preprint arXiv:1608.01409 (2016).

https://www.kinematicsoup.com/news/2016/9/6/data-compression-bit-packing-101, published Sep. 6, 2016.

Williams, Samuel, Andrew Waterman, and David Patterson. "Roofline: an insightful visual performance model for multicore architectures." *Communications of the ACM* 52.4 (2009): 65-76.

* cited by examiner

300 — Determine Parameters

302 — Create Code for Kernel

304 — Create Code for Matrix Mux

306 — Execute NN

308 — Preload a Subset of Input and Uncompress

310 — Iterate to Perform Matrix Mux on Uncompressed Input

312 — More Data?

No

Yes

314 — Load Data and Uncompress

316 — Combine Output Matrices

318 — Post-Processing

320 — Other Layers Execute

322 — NN Provides Output

SYSTEMS AND METHODS FOR ACTIVATION SPARSE AND KERNEL SPARSE GENERAL MATRIX MULTIPLICATION IN NEURAL NETWORKS

CROSS-REFERENCE TO RELATED APPLICATION DATA

This application claims benefit from U.S. provisional patent application No. 63/013,703, filed on Apr. 22, 2020 and entitled "ACTIVATION SPARSE COMPRESSION FOR KERNEL SPARSE GENERAL MATRIX MULTIPLICATION (GEMM) IN NEURAL NETWORK PROCESSING", incorporated herein by reference in its entirety.

FIELD OF THE INVENTION

The invention relates generally to neural network (NN) processing; specifically to taking advantage of sparsity in data used for NN processing.

BACKGROUND

Neural networks (NN), artificial NNs (ANNs) or connectionist systems are computing systems inspired by biological computing systems but operating using manufactured digital computing technology. NNs are made up of computing units typically called neurons (artificial neurons, as opposed to biological neurons) communicating with each other via connections, links or edges. In common NN implementations, the signal at the link between artificial neurons may be for example a real number, and the output of each neuron may be computed by function of the (typically weighted) sum of its inputs, such as the Rectified Linear Unit (ReLU) rectifier function. NN links or edges typically have a weight that adjusts as learning proceeds. The weight increases or decreases the strength of the signal at a connection. Typically, NN neurons are divided or arranged into layers, where different layers may perform different kinds of transformations on their inputs and may have different patterns of connections with other layers. Typically, a higher or upper layer, or a layer "above" another layer, is a layer more towards the output layer, and a lower layer, preceding layer, or a layer "below" another layer, is a layer towards the input layer. NN layers may include convolutional layers, pooling, output layers, an FC layer, a softmax layer, etc.

Such systems may learn by inputting training data, being presented with the correct output for and self-correcting. Such training may include a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

Various types of NNs exist. For example, a convolutional neural network (CNN) is a deep, feed-forward network, which includes one or more convolutional layers, fully connected layers, and pooling layers. Other NNs include for example long short-term memory (LSTM) networks.

A NN may be modelled as an abstract mathematical object, such as a function. Thus the NN may be "virtual" and no actual physical neurons, links, etc. may exist, these existing rather as data executed by processors. A NN may be translated physically to a CPU (e.g., a traditionally architecture computer, such as a PC) or graphics processing units (GPUs, specialized processors) as for example a sequence of matrix operations where entries in the matrix represent neurons and/or links (e.g. artificial neurons connected by edges or links) or other NN parameters and matrix functions represent functions of the NN. GPUs and similar massively parallel hardware devices may be used to provide the large amounts of compute typically needed to train and/or perform inference (e.g., operate at run-time) in NNs. GPUs can have thousands of relatively weak compute cores, small caches, but high memory bandwidth. This contrasts with traditional CPU architectures, that have few powerful cores, very large caches, low memory bandwidth, and have each core executing different instructions at different times in an asynchronous fashion.

A NN's weights and inputs may be represented as matrices, and the computation of the network (e.g. the inference or run-time operation) includes a sequence of multiplications of these matrices. Thus, developing fast matrix multiplication algorithms is key to the performance of NNs. Properties of these matrices can enable faster matrix multiplication algorithms. One such property is sparsity-a matrix is said to be sparse if it contains a lot of entries that are zero (0). While the input matrix of data to be processed at inference or run time (and the sparsity of the input matrix) is usually out of the network designer's control, the weights of the neural network can be made sparse using a technique called pruning. One may, for example, rank the neurons in the network according to how much they contribute, and then remove the low-ranking neurons from the network by setting their matrix entries to 0. The resulting sparse network can actually have the same or improved accuracy relative to the original network. The big benefit however, even when some accuracy is lost, is that the resulting network could be smaller and could have a smaller memory footprint with a proper sparse matrix representation. Computation during the matrix multiplication may be reduced if multiplying by the entries of the weight matrix that are zero is avoided.

SUMMARY

A system and method for performing multiplication for a neural network, e.g. for data of one or more layers in a neural network, may include loading a portion of a compressed version of a sparse input matrix into a cache memory; uncompressing a subset of the data in the portion of the compressed version of the sparse input matrix; and multiplying a sparse kernel matrix by the subset of the data using a set of instructions which are themselves created based on the sparse kernel matrix. (Kernels may be used in CNNs as filters applied repeatedly across an input, one small region at a time.) Some processes or elements may be referred to herein as "activation sparsity compression" or "layer input compression", where output from a layer of a NN is sparse, or is made sparse. Activation may refer to the output of a NN layer.

Embodiments of the present invention may reduce the computation involved with a kernel matrix (e.g. matrix A in an A×B=C operation) by encoding the sparse weight values in the instructions such as fused multiply-add (FMA) or other vector instructions ahead of time, and compressing B using its natural sparsity or by other methods before it is used in the multiplication. Advantage may come from compressing input matrix B and only uncompressing B when B or a portion of B is brought in to cache (e.g. an L1 cache local to a core): improvements may occur in that B is loaded and brought through the cache hierarchy in compressed form. B may be uncompressed just before compute or multiplication occurs.

Embodiments of the invention may create synergy based on several interrelated elements or processes, which alone, and even more so in combination, may provide improvements over currently available systems and methods for training, executing and/or inferring NNs.

Some embodiments of the present invention may improve prior NN inference by for example avoiding completely both certain matrix multiplication operations involving zero parameters and also branch operations (e.g. if zero then do not multiply) which may attempt to avoid such zero operations. In some embodiments, executing code created from or embodying non-zero kernel entries may increase the number of instructions stored in a cache (e.g. an L1 instruction cache). Prior art methods may execute on compressed input data, which may require extra instructions such as indexing or FMA instructions to multiply using compressed input data: these prior art instructions may also be stored in an instruction cache. Embodiments of the present invention may avoid the competition for space of instructions embodying non-zero kernel elements and instructions operating on compressed input data, and thus avoid time spent loading instructions to cache.

The software or code produced may be executed during a matrix multiply operations, for example as part of a larger application such as a NN inference application. Applications other than NNs may use matrix multiply operations which may benefit from sparsification.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
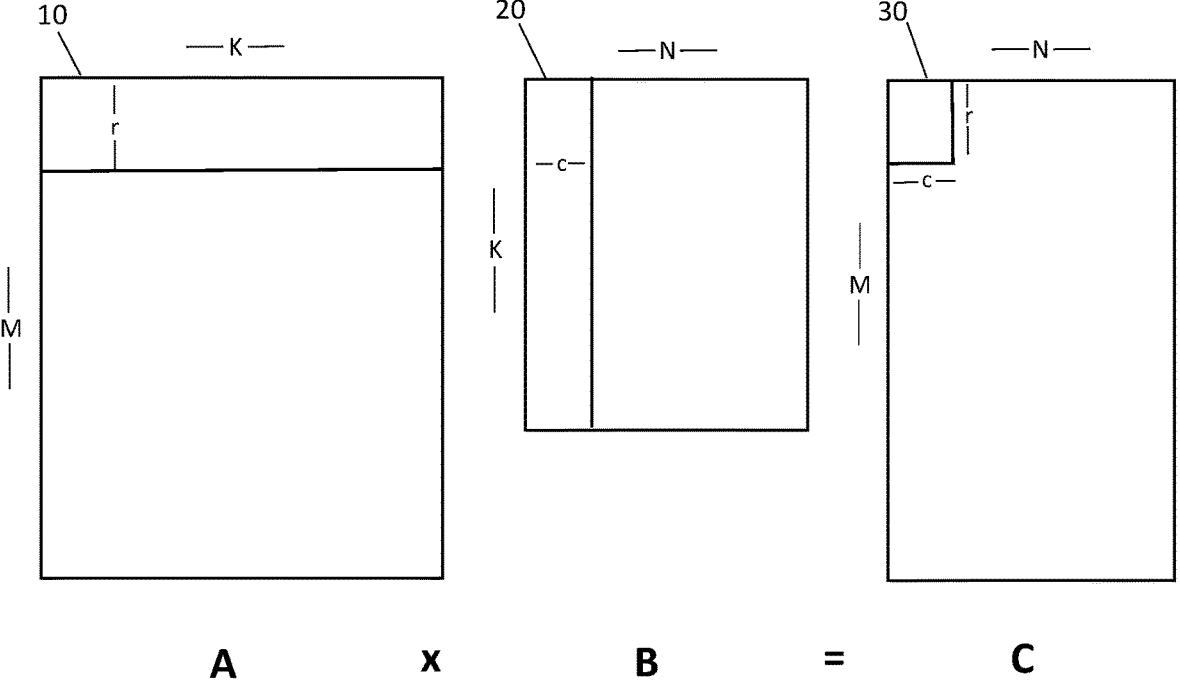
FIG. 1 shows a submatrix or block of a first (e.g. kernel) matrix A being multiplied by matrix or submatrix of matrix B (e.g. input to a layer) to result in output submatrix or block of matrix C, according to one embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

A NN may execute a layer by multiplying input (e.g. data output by a previous NN layer, or the input to the first layer of a NN), by a kernel (e.g. a set of weights or other parameters), where the kernel may be executed across a series of tiles or patches of the input. The kernel may be part of the data defining the NN. Each of the input and kernel may be represented by matrices, sometimes referred to as A for the kernel and B for the input. After the multiplication, the output for the layer may be placed in a matrix, often denoted C (such that A×B=C), and an activation function such as the ReLU function may be applied to the output values in C. In doing so, C may become sparse.

When discussed herein layers that are earlier, previous, before, prior, etc., a certain layer are more towards the input of the NN (e.g. towards input 20 or first layer 15A) than that certain layer; and a layer subsequent, after, later than, etc. a certain layer is a layer that is more towards the output of the NN than that certain layer. Such terminology applies within and among pyramid tasks or tensor columns: e.g. the last-executed layer in a pyramid or tensor column is the layer furthest from input and closest to output within the pyramid, and a pyramid closer to input of a NN is earlier in the NN than a pyramid closer to output of the NN. For two adjacent pyramid tasks, an earlier task being closer to NN input may output to a next task closer to NN output, the earlier task being previous to the next task.

A matrix may be considered to be dense if the number of non-zero or non-identical elements in it constitutes a large fraction of the matrix, e.g. above a threshold. It is sparse otherwise. For general matrix multiplication (GEMM), multiplying a sparse matrix by a dense one, or a sparse vector by a dense matrix, has many effective solutions. However, the problem of multiplying a sparse matrix by another sparse matrix is not well developed. One reason for this is that typical solutions to the problem attempt to attain speed by reducing the amount of computation proportional to the zero elements in both matrices. Embodiments of the present invention may include this multiplication where the sparsity of one sparse matrix is used to reduce the amount of compute while the sparsity of the other is used only to reduce the amount of data transferred from a memory external to the processor (e.g., not to further reduce the amount of compute). Embodiments may use this in the context of NN execution, such as where the matrix that reduces the compute (and possibly some of the memory traffic) is the kernel (e.g. weight) matrix and the matrix that reduces only the data transfers, the memory traffic but not the compute, is the input matrix (e.g. the activation data coming from a layer in the NN).

Embodiments may improve prior art processes by reducing the overhead of bringing from memory the input data matrix, e.g. for a GEMM matrix multiply operation, in layers of a NN that have convolutions or fully connected layers followed by non-linear operations like ReLU. One embodiment uses a "sparse GEMM" in a forward pass of a neural network execution, though in some embodiments this is used in a backward pass of NN training. Embodiments can also have applications to executing sparse by sparse matrix multiplication in other domains that are not necessarily neural network executions.

A sparse GEMM algorithm may be a set of code which is created by creating instructions, such as FMA instructions, for non-zero elements of an input kernel matrix, such that the non-zero elements are embodied in the sparse GEMM code. Some embodiments may move compressed data into an L1 or other cache, uncompress a portion of the data such that the uncompressed data remains in the cache into which the compressed data was loaded, execute a sparse GEMM algorithm embodying sparse kernel data on the uncompressed portion, then compress the result. In some embodiments, the only place uncompression occurs is at compute. Embodiments may arrange code and/or data such that instructions executing matrix multiplication (e.g. FMA instruction) do not compete for space in an L1 instruction cache with instructions performing uncompression (e.g. FMA instructions). Embodiments may avoid using instructions, required in prior art methods, which perform multiplication on compressed matrix representations, such as CSR representations (e.g. such prior art method not decompressing before multiplying): these instructions may compete for matrix multiplication instructions in a cache space.

Some multicore CPU processors include several layers of cache. For example, on some Intel many-core (e.g. desktop or server) processors a third level of cache, known as the L3 cache, is large and shared among all of a processor's computing cores. Other levels of cache, such as L1 and L2, are faster and private to a specific core. Caches may be separated into instruction and code: for example there may be an L1 cache storing instructions and a separate L1 cache storing code to be executed. While some specific embodiments are described in terms of L1, L2, and L3 cache levels as in Intel architectures, embodiments may work with other architectures with a hierarchy of shared and core-exclusive cache levels). Examples are provided herein executing on a typical multicore CPU that has a cache hierarchy with at least two levels (e.g. L1 and L2) of caches and which support of vector operations such as AVX instructions. However, other architectures may be used.

For caches and memory, the compute-to-memory ratio (CMR) may be defined as the ratio between the system's maximal number of compute operations per second, and its memory bandwidth. For example X86 family CPUs may have an FMA instruction set that is an extension to the "Streaming SIMD Extensions" instructions which may perform fused multiply-add (FMA) operations that operate on long bit vectors, for example 128 bits, 256 bits, or even 512 bits. For example, a single 512-bit FMA instruction can be used to multiply 8 pairs of 32-bit numbers, and add another accumulator number to each product. Embodiments of the invention may use such instructions. While CPUs are generally described herein, embodiments may work on GPUs, or other multicore computing devices.

The arithmetic intensity (AI) of code or an algorithm may be the number of compute operations it performs per byte fetched from, or stored to, a certain level of the memory hierarchy (e.g. shared cache or main memory). If the AI of an algorithm executed on some architecture is not higher than the CMR of some memory level on that architecture, the execution will be memory bound, e.g. bottlenecked on bringing the data in or out of that memory level. In such a case, the algorithm may behave as it were being executed on a processor capable of fewer compute operations per unit time. One way to increase the AI on a modern CPU includes reducing or eliminating branching, conditionals, and indirection, and to execute the majority of instructions as FMAs.

A sparse GEMM operation may accept as one input a matrix, A, the kernel matrix or matrix of weights, which is sparse due for example to a process of pruning performed before execution time. In one embodiment, the non-zero weights or values of this sparse matrix can be encoded in the instructions such as FMA instructions to be executed by a sparse GEMM algorithm. However, embodiments can also compress the sparse weight matrix A and execute it in a sparse manner using for example a compressed sparse row (CSR) implementation or a variant of CSR: some embodiments may use a compressed sparse column (CSC) representation, indexing or compressing columns instead of rows but otherwise similar to CSR. While certain compression algorithms are described herein, other compression algorithms may be used.

Multiplication (e.g. GEMM) for a NN layer according to some embodiments may take as input a second input matrix B representing, for example, input data to a NN layer, which may be sparse. The matrix made sparse at execution time, before being used by the multiplication, for example through an activation sparsification process caused by ReLU operations or enhancing techniques such as "FATReLU" operations in a prior layer in an inference pass. Other activation sparsity methods may be used. Sparsity can be due to Max-Pooling in a backwards pass execution during training, or other methods. This technique may include sparsifying the input matrix in layers of a neural network and generating code, such as pseudo code shown in Table 1 herein, appropriate for use in executing that network. The sparsification of matrix B can be done at run time before it is input to the matrix multiplication algorithm. In one algorithm, sparse input data matrix B may be encoded in a special sparse representation before being input to the multiplication. The output of the multiplication may be an output matrix C, that can later be compressed using the same compression algorithm as B before it is output to be used, for example, by the next layer GEMM execution in a neural network.

An activation function for units or layers of an ANN describes how ANN units transform inputs to an output. One embodiment may use an activation function for units or layers of an ANN, called Forced-Activation-Threshold Rectified Linear Unit (FATReLU) to increase the activation sparsity of an ANN. The term "activation sparsity" may refer herein to a level of sparsity (e.g., a number or a ratio of zero-valued elements) in the output of a NN layer, e.g. in one or more specific activation matrices of a NN model. The typical ReLU function in NNs takes or converts any negative output to 0. A FATReLU activation function may increase the activation sparsity level of a layer (and thus input to matrix multiplication required for another layer) by increasing the value of the threshold T below which all values are mapped to 0, from 0 (as is the case for ReLU) to a dynamically adaptive threshold value T>0, where T may be any positive value. The resulting activation function is described mathematically in example Equation 1 below, for a fixed value of an activation threshold T (e.g., T=1).

$$FATReLU_T(x) = \begin{cases} x, & \text{when } x \geq T; \\ 0, & \text{otherwise.} \end{cases} \qquad \text{Equation 1}$$

where x is an independent variable, and T is the activation threshold value.

Activation functions other than ReLU or FATReLU may be used.

Some embodiments do not execute the multiplication or GEMM on the compressed matrix B to reduce compute as is typical in prior algorithms. Rather, an embodiment may uncompress input data (matrix B) piecemeal during its execution before having the multiplication execute instructions such as FMA instructions on it. Thus, an embodiment may execute on B in "dense mode", e.g., computing FMA operations on all its elements (even if B is sparse, not dense), in particular all its zero valued elements: uncompression of B may introduce zero elements when compared to its compressed version. This differs from prior uses of compression in sparse GEMMs, as embodiments may take advantage of the inventors' discovery that in sparse GEMM executions where the weight matrix A is sufficiently sparse, the main execution bottleneck is not the computation of matrix multiplication operations (e.g. FMAs), but the cost of bringing the values of B from memory external to the processor, through the cache subsystem to L1 cache, the caches typically being internal to the processor. In other words, instead of saving on compute by loading B compressed and executing on B's compressed representation to avoid computing on B's zero elements, an embodiment may uncompress B prior to computing on it, and incur this cost. Thus embodiments may save instead on the cache bandwidth overhead of the data transfers of B all the way to L1 or L2 or other cache within the processor (e.g. from memory external to a processor through intermediate cache L2 within the processor). Thus, by executing the operations such as FMA operations in the sparse A and "dense" (e.g. uncompressed, but sparse) B an embodiment may achieve speed both by reducing the overhead of bringing B into L1 by using compression; and also speed up the computation more than the process having had attempted to also keep B in a compressed format throughout and execute only on the non-zero elements of it. This is because in some contexts performing multiplication on compressed data (e.g. CSR), requires loading instructions into an instruction cache (e.g. an L1 instruction cache) which may evict multiplication instructions from that cache, causing time spent on instruction loading and/or because it simply takes more instructions to process the CSR format, than just a plain series of FMAs operating on dense/uncompressed data. One reason for this is that in a multiply algorithm using an FMA vector instructions it may be hard to come up with an effective algorithm that will fit the sparsity of both kernel A and input B with the same FMA instruction. It may be difficult or impossible to use a compression algorithm such as CSR on both A and B; in embodiments of the present invention the kernel A is compressed by being embedded in sparse code, allowing B to be compressed using algorithms such as CSR. Caches may store data and/or instructions. Some embodiments may improve cache usage and reduce memory access by allowing kernel A and input B to be stored in separate caches: kernel A if converted to code may be stored in an instruction cache, and B may be stored in a data cache.

Embodiments may perform sparse GEMM or multiplication when the kernels are sparse, to multiply a weight matrix A by an input matrix B to produce an output matrix C. The matrices may be split into blocks. Thus when discussed herein weight matrix A, input matrix B and output matrix C may be blocks produced by dividing larger whole matrices A, B and C. In some embodiments, a source sparse kernel matrix A and source data matrix B may be divided to submatrices prior to processing and the output matrices C' maybe combined to a matrix C, where A×B=C, and A'×B'=C' where A' and B' are divided submatrices. While some embodiments may utilize known subdividing (e.g. blocking) of matrix multiply operations, such subdivision need not be used in other embodiments. Blocking or division of kernel matrices may be performed by forming code blocks (e.g. using sample code in Table 2 below) with parameters defining blocking dimensions.

FIG. 1 shows a matrix, or submatrix or block (e.g. divided by known blocking techniques) of a first (e.g. kernel) matrix A being multiplied by matrix or submatrix of matrix B (e.g. input to a layer) to result in output matrix, submatrix or block of matrix C. Matrices A, B and C in FIG. 1 may have been divided by blocking techniques, but need not be, and subblocks within A, B and C may be operated on separately to compute C (whether C is a portion C' of output C or the entirety of C) piecemeal. Thus the multiplication of matrix A, whether a full matrix or a submatrix produced by blocking, may itself be performed in pieces or subblocks. In an example shown in FIG. 1, the multiplication of a submatrix or subblock of A 10 of depth r by a submatrix or subblock of B 20 of width c produces an output submatrix of C 30 of size r*c. In one embodiment, the multiplication of a submatrix 10 by submatrix 20 to produce submatrix 30 is performed by inner loop 3 in example Table 1, and outer loop 1 of Table 1 produces the entirety of C. Submatrices A, B and C may be later combined using known blocking techniques to produce a larger output C from subblock output C of size M*N. A may be compressed or converted into instructions (e.g. FMAs) by embedding the weights into the code, while B may be compressed in columns of width c and depth K, where c can be a parameter of an instruction operating on the matrices, e.g. c may be the width of for example an AVX vector instruction.

Matrix C may not be compressed until after the overall computation of C is complete (e.g. by the completion of all loops in example code in Table 1, and also possibly by the recombining of multiple submatrices C' to one larger matrix C) and it moves from cache to main memory. Prior to compression an activation function such as ReLU may be applied to the elements of C.

In compressing B, an embodiment may rely on the natural sparsity of activation maps or the data that is passed between layers in NNs, e.g. CNNs. For example, some residual models trained on the "ImageNet" task may have such sparsity, as may other datasets used with embodiments of the present invention (for example, the CIFAR-10 and CIFAR-100 labelled datasets) and other architectures (e.g. the residual or "ResNet" NN and Mobilenet NN) used. A large proportion of the data passed from one layer to the next in a NN may be zeros, and thus the data may be sparse. However, the details of such sparsity—which data is zero—is not known until inference, when the data is computed. Activation sparsity may be linked with the functions used by neurons or nodes in the NN; e.g. with the structure of the ReLU non-linearity. If input data to this function were completely random, then we would expect an output activation sparsity concentrated around 50%. However, if one examines the average activation map sparsity across several batches, one notices that layers which are closer to the input tend to have activation sparsity that is lower than this threshold, whereas later layers tend to have higher activation sparsity. One intuitive (but imprecise) explanation for this phenomenon could be that earlier layers adapt to extract more numerous low-level features, whereas the later layers would extract higher-level features.

There are a variety of techniques for compressing sparse data that may be used in embodiments of the present invention. One embodiment uses the CSR technique known in deep learning systems to compress input data, such as activation data coming from a layer. While R in CSR stands for "row", in some embodiments columns may be compressed; thus some embodiments may use a CSC technique.

Using CSC or CSR, one can encode a sparse matrix with a reduction proportional to the level of sparsity/1.25. For example, an 80% reduction in the number of non-zero values may end with a 4× reduction in space, and a 90% reduction pay produce an 8× reduction in space. In an embodiment using CSC, every sparse B block of B may be divided into N/c columns of width c, where each column of width c and depth k is compressed and stored separately. An embodiment may place or store these compressed columns in consecutive locations in memory, possibly in a cache aligned way. Another embodiment may implement CSR or CSC using bitmaps that can speed up the uncompressing at run time. Keeping uncompression fast may aid performance.

The weights of A, which may be inputs to the sparse GEMM, can be compressed by being embedded in the set of instructions (e.g. FMA instructions) using full loop unrolling, and C may be produced as an output matrix. In some embodiments, neither kernel input A nor output C need to be compressed in any other way. The compressed block of matrix B may be brought piecemeal into a cache, such as first into an L2 cache then from L2 into the L1 cache of the processor. Because B is compressed, larger blocks of B can be brought into L2 at the same time and more of B can be moved into L1 at the same time than in prior art systems. Code which embodies NN kernel values to perform NN matrix multiplication (e.g. revised sparse GEMM which includes additional code uncompressing input B) may be executed in a pattern such as in Table 1 below (with comments starting with//). In the case blocking is used to divide matrices before multiplication, code such as in Table 1 may be performed for each submatrix and a combination operation may be used after each of the multiple multiplication operations are performed.

compressed version of a sparse input matrix, e.g. a matrix B of input data (e.g. data input to a NN or output from a NN layer). Typically, only a portion of matrix B is input and uncompressed at once. In some embodiments, a multiplication operation is performed only if the target element if the input is non-zero; otherwise no multiplication is performed. Further, in some embodiments, a multiplication operation is performed only if the one or both of a kernel element is non-zero and/or the target element if the input is non-zero; otherwise no multiplication is performed. While input B may be loaded (piecemeal) from memory and uncompressed in cache, the uncompressed portion of B being stored in cache, in the example code provided, the portion of B being multiplied may be loaded to vector or registers, e.g. AVX registers, before being multiplied.

The preload of a portion of data (e.g. preload to a cache some n blocks of B) may be performed by a "dummy" read instruction from memory which may have the effect of loading the compressed data to cache. In some embodiments, the preload operation and/or the preload of the next block in the sample algorithm in Table 1 may be effected by multiply instructions (e.g. FMA instructions) making specific memory references to data, causing the data to be loaded to a cache. The preloaded data may be preloaded to a cache memory internal to a processor from an external memory external to the processor, for example according to the cache-memory configuration in FIG. 2, although other architectures may be used. Typically, loading to a cache is performed by an access to external memory (e.g. certain size relative to the known size of the processor's caches), a set of accesses designed such that the target architecture's cache policy loads or saves the data to a certain cache or a desired specific level of cache. Thus example instructions such as

TABLE 1

```
preload (to cache such as L1 or L2) and uncompress some n (out of N) blocks of K
x c elements of B  // load a portion of compressed B, the ones used in
Loop 2 below, this is an initial buffer; alternately data can be loaded and/or
uncompressed instead in inner Loop 3
1: for each horizontal block of r rows in C (in any order) //Loop 1
    2: for each r × c block of elements in that block (in any order) //Loop 2
        3: for each non-zero element e in the corresponding r × K block in
A (in some chosen order) //Loop 3
            multiply e by the corresponding sequence of vector(s) in the
corresponding K × c column of B (already preloaded) and add the result to the
corresponding elements in C // memory (e.g. .data) or vectors or registers hold a
portion of B, originally loaded from memory (or lower level cache, one further from
a CPU than a higher level cache to which data is loaded) and uncompressed
then preload and uncompress the next block of K × c elements of B (beyond the n
that were already preloaded to L1 and not yet used) // repeat loading,
uncompressing and multiplying until all subblocks of the input matrix have been
multiplied
    repeat Loops 1, 2 3 for next block of C
```

Other or different code may be used, and other sets of instructions may be used. Typically, the operations of Table 1 are used on a trained NN during inference (execution), but in other embodiments, the operations in Table 1 may be used in other contexts. A process as in Table 1 may attempt to overlap the un-compression instructions with the multiply (e.g. FMA) instructions to reduce uncompression latency or delay (for example, by using preload instructions and interleaving both uncompression and FMAs). Modern CPUs may perform this as part of out-of-order execution.

Code according to the example in Table 1 may perform multiplication for a neural network, e.g. using vector multiplication operations such as FMAs (e.g. as in "multiply e by the corresponding sequence of vector(s)"), by first loading a portion (e.g. as in the example preload operation) of a "preload (to L1)", uncompress some n" may reference specific external (to the processor) memory, but may have the effect of loading data from external memory from cache, and then when uncompressing writing to the cache instead of memory (the data may be eventually written back to memory); further instructions such as "multiply e by . . . " and "add the result to . . . " may effectively take as input data from cache (e.g. uncompressed data) and write the results to cache or to internal registers.

Typically, a subset of the data in the portion of the compressed version of the sparse input matrix is uncompressed at any one time. A portion or all of the preloaded data may be uncompressed (e.g. using known uncompress algorithms), and the uncompressed data may be stored back to the same cache. The multiply (e.g. FMA) instructions may reference uncompressed elements of B, and thus the uncompress operations may need to be performed to arrange the uncompressed elements of B to be addressed by their proper memory locations (while typically being stored in cache, but addressed by reference to memory). The uncompress may include instructions that write the uncompressed data to memory, but which have the effect, due to cache policies, of writing the uncompressed data to cache (e.g. an L1 cache); the processor's cache policy keeps the data in cache for some period of time. The portion of input B which is uncompressed may be stored to a memory location per instruction code. However, due to cache policy the uncompressed data may actually be stored in cache. After the uncompressed portion of B is evicted from cache and stored to memory, it may be stored to a "scratchpad" portion of memory.

A sparse kernel matrix (e.g. A) may be multiplied, e.g. using FMA or other instructions, by the subset of the data—the decompressed subset. Thus multiplication may be performed using a set of instructions which are created based on the sparse kernel matrix, e.g. using operations such as in Table 2. The set of instructions created to multiply the sparse kernel may include instructions relating to non-zero elements of the sparse kernel matrix and may not include instructions relating to zero elements of the sparse kernel matrix. In the example code in Table 1, "for each non-zero element e" may be embodied in this code, in that this code is created only for non-zero elements. The uncompressed input may be stored in a sequence of vector(s) or vector registers, which represent the corresponding K×c column of B. The uncompressed input may be stored to memory, e.g. a .data block in memory referenced by multiply-add instructions representing a kernel (see, e.g. Table 2): storing to memory may mean in effect storing the uncompressed B data to cache. The uncompression code may be coordinated with multiply code such that the proper B data is read by the multiply code.

B may be an input matrix having N columns and K rows. In one embodiment, the number of blocks preloaded to a cache (e.g. L1) may be fixed at some multiple of K×c elements of B, where K is a dimension of B—the number of rows—and c is determined beforehand based on the target architecture meant to execute the code; the size of "uncompress some n" may be K×c. Each loop 3 (per the example labelling in Table 1) of "3: for each non-zero element e in the corresponding r×K block in A" may operate on one K×c chunk of uncompressed data. A target architecture may be for example, an X86 architecture, Intel many-core, or AVX2 or AVX512 processors, e.g. provided by Haswell, Broadwell, Cascade and Skylake Optimized parameters may be determined before code is produced, for example code according to the examples in Table 1 and/or Table 2 are produced. Parameters may be produced based on parameters of the target architecture and/or the sizes of inputs such as a kernel or input matrix. Parameter c may be for example the width of a register in a target architecture, e.g. the width of data elements operated on by the instruction. The number of registers available may be used to determine r.

An embodiment may proceed iteratively, such that uncompressing and multiplying are performed over a series of iterations. Prior to the first iteration, a buffer of compressed input matrix data may be uncompressed, and on each iteration, a further amount of uncompressed data may be added to the buffer. Embodiments may initially uncompress a buffer of B which is several times more (e.g. 5 times more) than is needed for one inner Loop 3 in Table 1, and then to maintain the buffer, during, before or after each loop uncompress a further portion n of the N columns of B, where n may be determined by the amount of data needed for a single outer loop of "for each horizontal block of r rows in C" (loop 1 in Table 1); e.g. enough data to perform one stripe of a matrix multiply operation such as a K×c column of B.

The amount of data uncompressed may be defined parameter c: the width of a column of C may have dimensions c, where c is both a dimension of C and the size of registers available to accept a portion of output to be placed in C. The width of a column of C may be the number of elements across a row of C which are defined to be in a column of C: multiple elemental columns of C forming a larger column having width c.

An embodiment may choose parameters defining multiplication code to avoid or prevent instructions for uncompression mixing in the same instruction cache as instructions for matrix multiplication, to avoid uncompress instructions evicting multiplication instructions. These parameters may be based on a target or architecture processor, e.g. the processor executing the produced code such as an Intel many-core (e.g. desktop or server) processor or a processor using AVX instructions.

Multiply-add instructions which multiply kernel by input to produce output (e.g. multiply c by vector(s) and add the result to elements in C in the example code in Table 1) may be produced by loop unrolling, creating from a sparse kernel matrix executable code including only necessary multiplication operations on non-zero elements of the sparse matrix. In one embodiment these instructions include a broadcast and FMA instruction and may be produced by an example process as shown in Table 2, but other types of instructions may be used for matrix multiply instructions, and other methods of producing matrix multiplication code may be used. The memory location referred to as an input for matrix B in Table 1 may be the uncompressed version of B produced by code in Table 1.

A process may "preload" a subset of the columns of an input matrix B to, for example, an L1 cache or other cache close to the processor. When discussed herein, loading data or instructions into cache may involve loading the data or instructions from memory using known memory access commands, but executing code or data access operations, or designing the code or data access, so the data size it requests from main memory is highly likely to be placed in B due to the particular processor's cache policies. Preloading the subset of B columns may follow other patterns so as to better fit the cache replacement policy of the L1 data cache. Embodiments may use code designed to bring as much as possible of B into the L1 data cache. The actual computation on the (e.g. vector) elements of B using for example FMA instructions in Loop 3 may be performed on a "dense" version of B (e.g. uncompressed, but sparse) after it has been preloaded into an L1 cache and uncompressed in the L1 cache. Different techniques for pre-loading B elements may be used, for example via automated prefetching via register allocation or by explicit prefetching instructions. It is desirable in some embodiments to perform as much of the preloading of a large chunk of B before the start of the loops in Table 1 so as to minimize the use of compression instructions in the instruction pipeline while the multiply (e.g. FMA) instructions are being executed.

After a kernel (e.g. A) is multiplied by an input (e.g. B) the output may be in a matrix which may be termed C. A typical CNN operation may then apply an activation function such as ReLU to each element of the matrix, resulting in a final output matrix C which may be sparse. This sparse C matrix may be written back to memory, possibly after being compressed. Compressing C after kernel instructions have been used for multiplication may improve throughput by avoiding kernel multiplication instructions competing for instruction cache space with compression instructions.

According to some embodiments, a CSR or CSC representation, or Yale format, of data may be a compression of that data that represents a matrix by several, e.g. three or four, one-dimensional arrays, that respectively contain non-zero values, the extents of rows, and column indices. An example CSR representation may represent the uncompressed data, when compressed, as separate tables or arrays, e.g. four component arrays: (a) a value array which may include all of the non-zero input elements in contiguous memory; (b) an index array which may include the indices of the elements in the input matrix data element I, within their respective row; (c) a row length array, which may include the number of non-zero elements of each row; and (d) a row offset array, which may include the offset denoting the first element of value array element and an index array element corresponding to a given row.

For example, if the source uncompressed input matrix I is:
0 2 3
1 −1 0
0 0 4
The corresponding compressed CSR arrays may include the following example arrays:
Value array=2 3 1 −1 4
Index array=1 2 0 1 2
Row length array=2 2 1
Row offset array=0 2 4
This technique may index columns, using CSC, where values are read first by column, a row index is stored for each value, and column pointers are stored.

CSC or CSR may be uncompressed by having its elements extracted from the compressed CSC or CSR version, using known methods.

Embodiments may use compression other than CSC or CSR, as some embodiments do not need to have access to the elements of the sparse matrix (CSR compression allows access to compressed data). Some embodiments, unlike algorithms that execute on the sparse representation of input data (e.g. B matrix), may only compress rows (or columns with CSC) and then uncompress them before execution. This means embodiments may compress without being able to (or the need to) access and compute on the individual items in the compressed data, opening the possibility of compression techniques that are tailored to specific types of data or techniques that encode or restructure the data when it is compressed. For example, embodiments may use the techniques such as bit packing; further compressing the CSR or CSC representation; or cache or register aware compression. Embodiments that may execute with B in "dense" (e.g. uncompressed) in L1, may use AVX instructions for direct compression/decompression via masks to/from registers.

Some embodiments may encode sparse weight or kernel values in instruction code, e.g. a series of FMA and/or other instructions, ahead of time, e.g. before inference or training. The resulting "unrolled" loops may be used within or interleaved within a larger process, such as the code depicted in example Table 1. Such code may avoid performing unnecessary and costly operations associated with zero elements of a matrix such as branching instructions. This may be accomplished by developing from a sparse matrix executable code including only necessary multiplication operations on non-zero elements of the sparse matrix, and not including any code, if-then, or multiply operation for zero elements. On a given multiprocessor, the maximum amount of computation that can be performed per cycle is fixed, hence efficiency is measured by compute utilization, e.g. a fraction of the time spent on actual computation on a given piece of data as opposed to the time spent accessing that piece of data from memory. In order to achieve high compute utilization on modern multiprocessors (including both CPUs and GPUs), vector processing instructions may be used, such as FMA, that operate on multiple items or words of data simultaneously.

An embodiment may transform the sparse matrix into executable code, which contains a floating-point multiply-add instruction such as an FMA instructions for each non-zero element—and typically no FMA instruction or other instructions for zero elements in the sparse matrix. Unlike previous approaches in which the compiled code stores addresses of elements, embodiments may store each value of the non-zero element of the sparse kernel or parameter matrix within the code itself, as a constant (for example in a dedicated .data section for such constants). Each FMA instruction then multiplies some non-zero value of the sparse kernel matrix (which may be broadcast to a vector register) by a set of consecutive elements of the input matrix (e.g. uncompressed B). Zero kernel values do not result in calculation instructions, branch instructions, or indexing.

In one embodiment, a process following the example pseudocode in Table 2 may be used as the core of a process to produce matrix multiply code or sparse GEMM code, typically machine code for the relevant target architecture. The example Table 2 code may attempt to issue as many FMAs per cycle given constraints of for example the target architecture and may operate based on or take as input optimization or optimized parameters such as R, C and L and/or other parameters. Parameters r and c may be as discussed above with respect to Table 1, and L may be an amount of registers available in a circular queue of registers. Other specific operations, different from those shown in Table 2, may be used. Other manners of producing code based on a sparse kernel may be used. The code for the sparse kernel may be written assuming an uncompressed input B; B may be uncompressed before a section of sparse kernel code is executed, as in the example Table 1. In some embodiments code such as in Table 2 may be augmented by preload/uncompress instructions as in Table 1 above.

TABLE 2

Generate/emit code to uncompress an initial buffer of B and save to .data+appropriate offset
Generate/emit code to initialize output registers C_0 .. C_[C]=0;
While A' contains unvisited non-zero elements do: //A' may be sparse kernel matrix
    For r in 1 to R
        If r-th row of A' contains unvisited non-zero elements do
            Let e be the first unvisited non-zero element of row r (in column order); // Visit only one non-zero element per visit to a row.

US 12,670,370 B1

15                                                                              16

TABLE 2-continued

```
        Let i = the column index of e in A' // e = the next to be visited non-
        zero element;
        Reserve a place in .data for e, and copy the value of e to .data;
        Let L be next line-register in the circular queue of L registers;
        Emit instruction BROADCAST of e to L (from offset location in
        .data) // offset in .data is encoded in the instruction; e.g. vbroadcast
        For j in 1 to C:
            Emit FMA: multiply L with memory at row i column j*S of
            B' (input data matrix) and accumulate to register C_j // The
            result is stored in C_j. One instruction for a group of S
            columns in B' and C.' Arguments to the FMA may be
            register L; a memory location (different for each FMA) for
            the i'th row in B or B'; and a vector register (different for
            each FMA) storing results in C or C' from its r'th row.
        End for
    End If
    End For
    End While
Generate/emit code to uncompress a further block of B and save to .data+appropriate
offset;
Generate/emit code to repeat above code starting from Generate code to initialize
registers C, for another section of A, B and C.
```

The pseudocode in Table 2 multiplies portions matrices—e.g. first multiplies the portion of A, B and C shown in FIG. 1, then another section, etc. Further, code generated may re-use instructions to iterate down a column of B, such that a loop may be emitted or generated to iterate generated code over a column of B. For example, after uncompressing a further block of B, a process may repeat over the already emitted instructions, since B may have multiple vertical stripes to process. In such a process, as long as A (e.g. weights) are still the same, the uncompression of B may proceeds with the same set of (already emitted) FMA instructions.

In the pseudocode in Table 2, the sequence "While A' contains unvisited non-zero elements do:/For r in 1 to R/If r-th row of A' contains unvisited non-zero elements do/Visit the next non-zero element" causes instructions to be issued for the first unvisited non-zero element of each row, travelling in row-increasing order. The sequence "While A' contains unvisited non-zero elements do:/For r in 1 to R" may cause each row to be visited once, repeatedly and iteratively, until all non-zero elements in A' are visited and have instructions created for them.

The example pseudocode in Table 2 may generate code to iteratively multiply an element from column i in A' by entire row i in B' to a destination being a set of registers making up row i of destination matrix C'. Iteration is performed by rows over R. A' is a submatrix which is sparsified to include many, e.g. a majority, of 0 values for entries. A' may be for example a matrix of NN weights or parameters. B' is a submatrix which may be for example input data to a NN. e.g. data representing an image to be categorized; per example Table 1 operations B may be uncompressed, typically section-by-section. R is the number of rows of A' (and C'), C is the number of registers used for columns of B' (and C'), where S*C is the number of columns for B' and C', S being the size of a register. Thus the "If . . . " process is repeated once for each of R rows. Emit is the generation of a code instruction: Emit vbroadcast means create a vbroadcast instruction (e.g. Load with Broadcast Floating-Point Data. e.g. "BROADCAST"); and Emit C vfmadds means create a number C of vfmadd (or other FMA) instructions. Emitting or creating a broadcast instruction (e.g. vbroadcast) may create such an instruction which sends data from an offset location in .data to a register L. Parameters for each FMA operation may be register L with multiple repeated single values, a memory location (or register) for row i in submatrix B', and a register of C' to be used (this register also being the output). The memory location for B' or B may be for the uncompressed version of that data. The FMA operation when executed may multiply a first argument by a second argument (taken from a register), accumulating the value in the register corresponding to the third argument. The FMA instruction when executed may multiply register L with row i in matrix B', accumulating in C.

Figure 2:
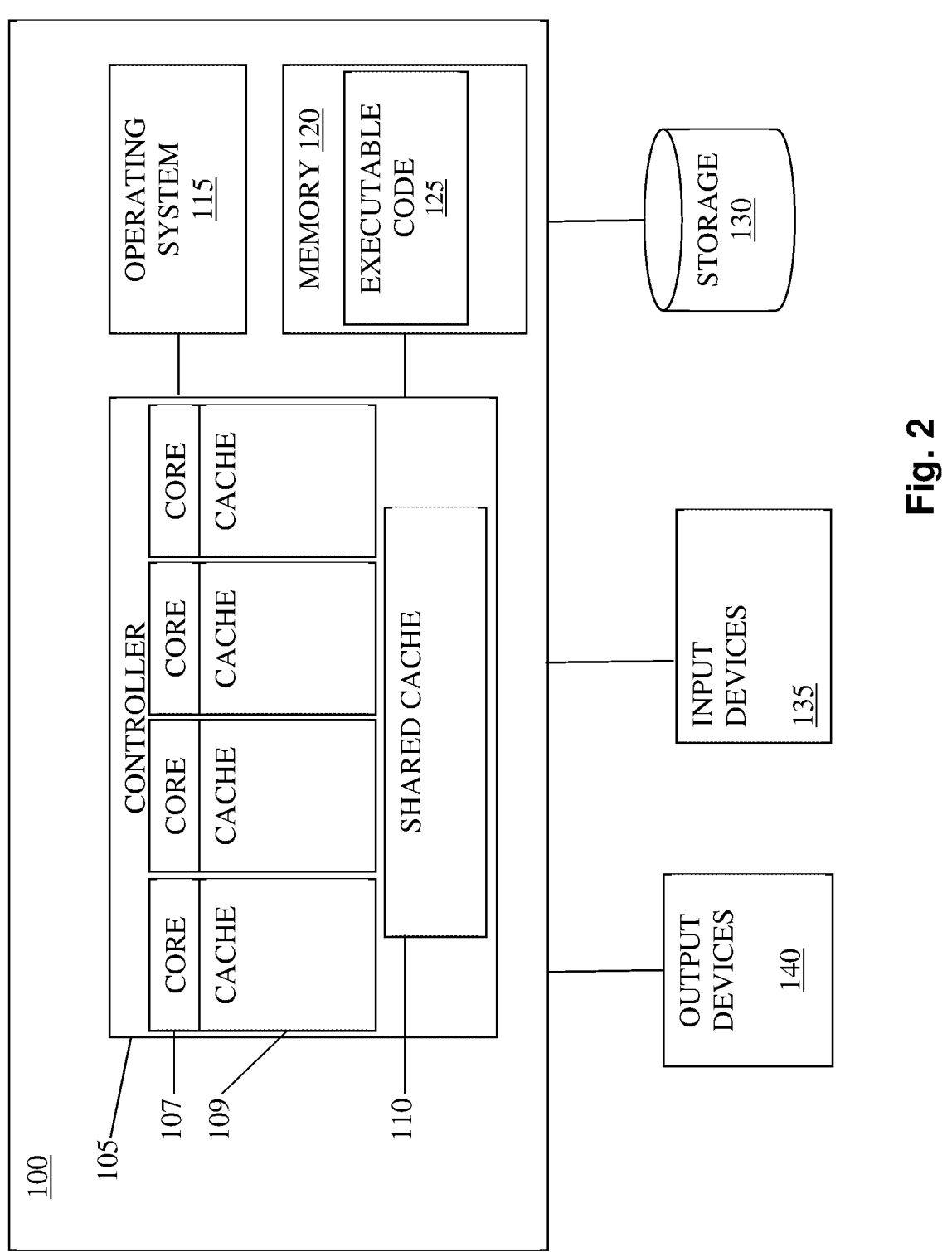
FIG. 2 is a high-level block diagram of an exemplary computing system which may be used with embodiments of the present invention.

FIG. 2 shows a high-level block diagram of an exemplary computing device which may be used with embodiments of the present invention. In some embodiments the computing device 100 of FIG. 2 may execute NN inference, using e.g. one or more processors such as processor 105, each of which may include multiple cores 107 (e.g. 4, 18, or other numbers), each such core having associated with it a private or local cache 109 (e.g. L1), local to or accessible only by that core, and the multiple cores in a processor sharing a shared cache 110 (e.g. L3), the caches located typically within or as part of the processor on the same chip. Other caches, such as L2 caches, may be included. Although example embodiments are described in in terms of L1, L2, and L3 cache levels as in Intel architectures, embodiments apply to any other architecture, with or without caches. Cores 107 may access tasks, code and data via references to external memory 120, the manner and frequency of access of this data, and the size of the sections of data accessed, may cause the data to be kept in caches such as caches 109 and 110. Memory 120 may be external to processor 105 and for example not on the same chip as cores 107 and caches 109 and 110; as opposed to caches 109 and 110, which are typically on the same chip as the processor, local to the processor or internal to the processor, or closer to the processor than memory 120. In some embodiments, some or all of cache storage may be off-chip, not on the same chip as processors or cores, but in general, access to caches 109 and 110 is faster than access to memory 120.

Controller or processor 105 may be or include, for example, one or more central processing unit processor(s) (CPU), one or more Graphics Processing Unit(s) (GPU or GPGPU), a chip or any suitable computing or computational device. Caches may be handled as is known in the art by a cache policy particular to the type or model of processor 105. Processor 105 may be one integrated circuit and cores 107 may be separate processing units each reading and executing program instructions. Thus a single processor 105 can execute different instructions or threads on different cores 107 at the same time, increasing overall speed for programs that support multithreading or other parallel computing techniques.

Computing device 100 may include an operating system 115, a memory 120, a storage 130, input devices 135 and output devices 140. Embodiments of the present invention, performing operations such as NN inference, may be executed by a device such as computing device 100.

Operating system 115 may be or may include any code segment to coordinate, schedule, arbitrate or control operation of computing device 100, for example, scheduling execution of programs. Memory 120 may be or may include, for example, a Random Access Memory (RAM), a read only memory (ROM), a Dynamic RAM (DRAM), a Flash memory, a volatile memory, a non-volatile memory, or other suitable memory units or storage units. Memory 120 may be or may include a plurality of, possibly different memory units. Memory 120 may store for example, instructions to carry out a method (e.g. code 125), and/or data such as NN data, data describing a NN. NN kernel information, etc.

Executable code 125 may be any executable code, e.g., an application, a program, a process, task or script. Executable code 125 may be executed by controller 105 possibly under control of operating system 115. For example, executable code 125 may when executed cause the NN execution or inference, or matrix multiplication, or the creation of NN or matrix multiply code, according to embodiments of the present invention. For the various modules and functions described herein, one or more computing devices 100 or components of computing device 100 may be used. Devices that include components similar or different to those included in computing device 100 may be used and may be connected to a network and used as a system. One or more processor(s) 105 including cores in processor(s) 105 may be configured to carry out embodiments of the present invention by for example executing software or code.

Storage 130 may be or may include, for example, a hard disk drive, a floppy disk drive, a Compact Disk (CD) drive, a universal serial bus (USB) device or other suitable removable and/or fixed storage unit. Data such as instructions, code, NN model data, parameters, etc. may be stored in a storage 130 and may be loaded from storage 130 into a memory 120 where it may be processed by controller 105. (In some cases such data may be loaded from a lower level cache to a higher level cache.) Some of the components shown in FIG. 2 may be omitted.

Input devices 135 may be or may include for example a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. Any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause or configure the processor to carry out methods disclosed herein.

Figure 3:
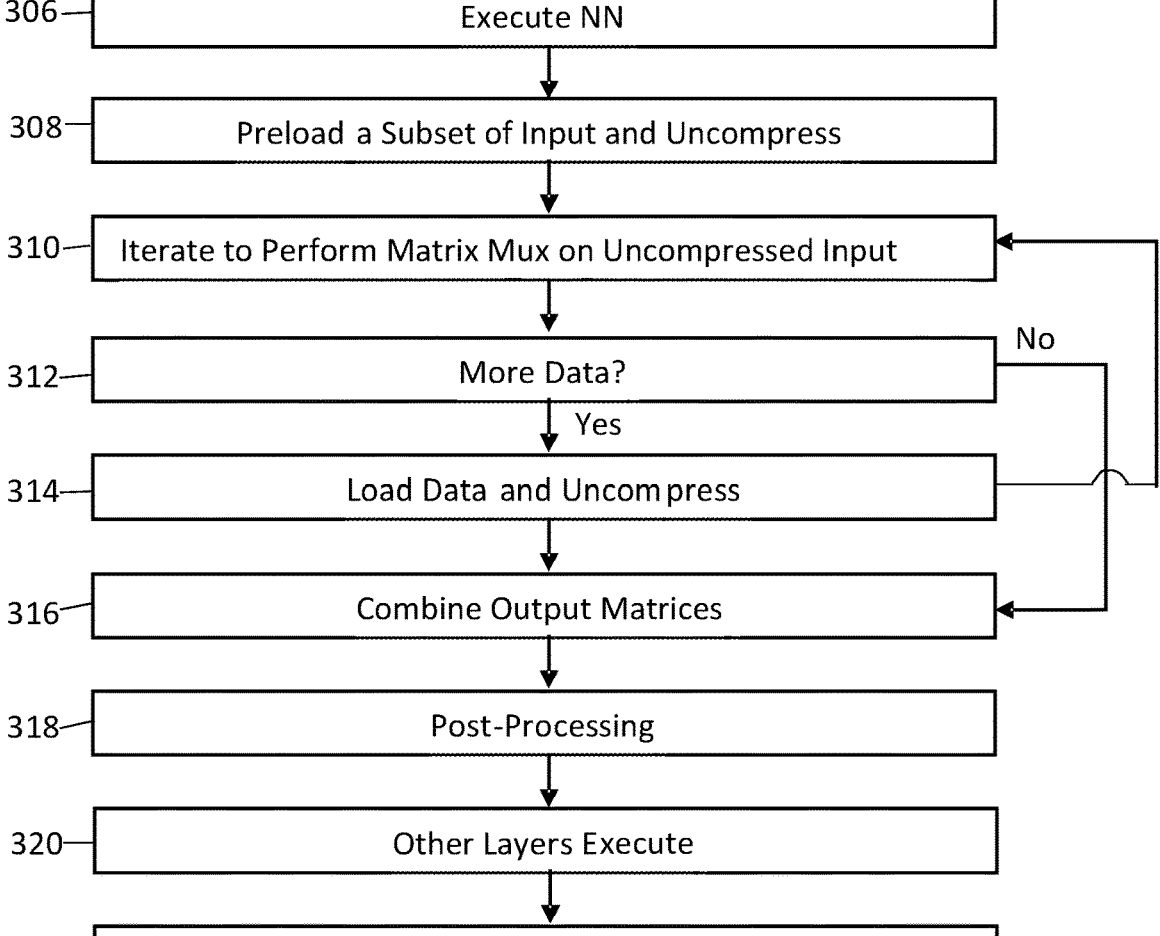
FIG. 3 is a flowchart of a method according to embodiments of the present invention.

FIG. 3 is a flowchart of a method according to embodiments of the present invention. The operations of FIG. 3 may be carried out with a system such as in FIG. 2, but other systems may be used.

In operation 300, parameters may be determined to define code and/or blocking or matrix division; this may be based on a target architecture and/or dimensions of data used. Blocking may be performed. Blocking includes known method of dividing input matrices into smaller matrices prior to multiplication, then recombining the multiple output matrices into one larger output matrix. E.g. the larger input matrices in the operation A×B=C may be divided into multiple matrices A' and B', each producing a smaller output C', and after multiplication multiple matrices C' may be recombined using known methods to C. Blocking in the context of embodiments of the present invention may include creating a division in advance for A', B' and C', and producing code which operates on that division; a separate code block may be created for each set of matrices A', B' and C'. Thus a "blocking" operation may involve defining parameters and producing code. Blocking may be performed based on parameters determined in operation 300.

In operation 302, code or instructions may be created based on a sparse kernel (e.g. matrix A). A kernel may be a part of a definition of a NN, typically an already trained NN. For example, the kernel may be "unrolled" by a process such as that in Table 2, or other methods. The resulting code may embody non-zero kernel values, and may perform matrix multiplication taking an input matrix, the result of the multiplication being the kernel (embodied in the code) multiplied by the input matrix. Since the matrix multiplication may involve multiplying a small kernel repeatedly across the input (e.g. the B matrix) the resulting code my perform this repeated multiplication. Code produced in operation 302 may be based on blocking and/or parameters; multiple code segments may be created, one for each divided matrix A'.

In operation 304, based in part on the defined parameters (e.g. operation 300) and the code created in operation 302, a set of code or instructions may be created to perform matrix multiplication in a NN using an uncompress scheme. The resulting code may for example execute the operations shown in Table 1 or other operations. Typically the code created is used during inference, but may be used in other contexts, e.g. training. In one embodiment, the code created in operation 302 to perform multiplication may be included or interleaved with other code which for example uncompresses data and controls the multiplication using loops. For example, an initial set of code may be emitted to uncompress a buffer of input, and for each portion of A, B and C multiplied, at the end of such a code section, code may be emitted to uncompress a further section B. Code may be added to perform, for example blocking (e.g. breaking up and or combining output matrices C' to C) or other functions.

In operation 306, a NN which includes as part of it the code created in operation 304 may execute. For example, a CNN or other NN may be provided with input (e.g. a photograph, an audio stream, etc.). Layers may execute which do not include the specific operations of operation 308-314.

In operations 308-314, as part of the NN execution, created code or instructions may execute to perform multiplication in the NN, typically on a layer of the NN. The code is typically executed during inference on a trained NN, but may operate during training or in another context. Operations 308-314 may use pseudo code described in example Tables 1 and 2.

In operation 308, a subset of input (e.g. data input to a NN, or data or activations output from an internal layer of the NN) may be preloaded from memory external to a processor to a cache within or local to the processor and uncompressed (or from a lower level cache to a higher level cache); the data typically relates to input to one layer. For example, a portion of a compressed version of a sparse input matrix may be loaded into a cache memory. The uncompressed results are typically placed in that same cache within the processor, but may be placed in another location.

In operation 310, a set of loops (e.g. as created in operation 304) may iterate based on the portion of data uncompressed in operation 308. The loops may perform a matrix multiplication on kernel data (e.g. sparse kernel data embodied within the code, which may be termed A) and input (the uncompressed data, which may be termed B) and output the data to an output matrix (which may be termed C), or to registers storing at least a portion of the output matrix.

In operation 312, if more data remains in input (e.g. B) to be multiplied, in operation 314 another set of data may be preloaded and uncompressed, and the process may continue with operation 310. If no more data remains in input the process may continue with operation 316, in which if blocking was used multiple output matrices (e.g. C') may be combined into one output matrix (e.g. C). Blocking need not be used.

In operation 318, post-processing may be performed after the multiplication. For example, an activation or neuron function may be applied to the elements of the output; e.g. a ReLU or FATRELU function, or another function. The output may be compressed whether or not an activation function is applied. The result of the multiplication, whether or not compressed and whether or not a function is applied, may be saved from cache to external memory.

In operation 320, more layers than those computed in operation 308-318 may be executed. This execution may include operations such as in 308-318. Layers may also be executed at the start of NN execution (operation 306) which do not include sparse multiplication and uncompression.

In operation 322, the NN may provide an output, e.g. a classification.

Other or different operations may be used.

While embodiments have been described in the context of NN learning, data processing in other contexts may make use of matrix multiply and computer code generation methods as described herein. Embodiments of the invention may be applicable to NNs computed with any sort of nodes, e.g., CPUs, GPUs, or other types of processors.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing." "computing," "calculating," "determining." "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of executing a layer of a neural network (NN), the method comprising:

loading, by a processor and from a memory external to the processor, a portion of a compressed version of an input matrix into a cache, the cache being local to the processor, wherein the input matrix comprises data output from a previous layer of the NN or input data to a first layer of the NN, wherein the previous layer is prior to the layer of the NN to be executed;

after loading the portion of the compressed version of the input matrix into the cache, generating, by the processor, an uncompressed portion of the input matrix by uncompressing the loaded portion of the compressed version of the input matrix, to avoid subsequently using instructions that perform multiplication on the compressed version of the input matrix when executing the layer of the NN, wherein the uncompressed portion is stored in the cache that is local to the processor;

after the uncompressed portion is stored in the cache, executing, by the processor, the layer of the NN by using the uncompressed portion of the input matrix stored in the cache, wherein the executing involves multiplying a kernel matrix by the uncompressed portion of the input matrix using a set of instructions, wherein the set of instructions were pre-generated prior to the execution of the layer of the NN based on the kernel matrix and relate to non-zero elements of the kernel matrix; and outputting, by the processor, an output generated by the NN based at least in part on the execution of the layer of the NN.

2. The method of claim 1, wherein the compressed version of the input matrix is compressed using a compressed sparse column (CSC) format.

3. The method of claim 1, wherein the set of instructions do not include instructions relating to zero elements of the kernel matrix.

4. The method of claim 1, comprising repeating the loading, uncompressing and multiplying operations until all of the input matrix has been multiplied.

5. A system for executing a layer of a neural network (NN), the system comprising:

a memory; and a processor comprising a cache local to the processor, wherein the memory is external to the processor, and wherein the processor is configured to:

load, from the memory external to the processor, a portion of a compressed version of an input matrix into the cache local to the processor, wherein the input matrix comprises data output from a previous layer of the NN or input data to a first layer of the NN, wherein the previous layer is prior to the layer of the NN to be executed;

after loading the portion of the compressed version of the input matrix into the cache, generate an uncompressed portion of the input matrix by uncompressing the loaded portion of the compressed version of the input matrix, to avoid subsequently using instructions that perform multiplication on the compressed version of the input matrix when executing the layer of the NN, wherein the uncompressed portion is stored in the cache that is local to the processor;

after the uncompressed portion is stored in the cache, execute the layer of the NN by using the uncompressed portion of the input matrix stored in the cache, wherein the executing involves multiplying a kernel matrix by the uncompressed portion of the input matrix using a set of instructions, wherein the set of instructions were pre-generated prior to the execution of the layer of the NN based on the kernel matrix and relate to non-zero elements of the kernel matrix; and outputting an output generated by the NN based at least in part on the execution of the layer of the NN.

6. The system of claim 5, wherein the compressed version of the input matrix is compressed using a compressed sparse column (CSC) format.

7. The system of claim 5, wherein the set of instructions do not include instructions relating to zero elements of the kernel matrix.

8. The system of claim 5, wherein the processor is configured to repeat the loading, uncompressing and multiplying operations until all of the input matrix has been multiplied.

9. A method of executing a layer of a neural network (NN), the method comprising:

loading, by a processor and from a memory external to the processor, a compressed input matrix into a cache, the cache being local to the processor, wherein the compressed input matrix represents an output from a previous layer of the NN or input data to a first layer of the NN, wherein the previous layer is prior to the layer of the NN to be executed;

generating, by the processor, uncompressed data by uncompressing data of the compressed input matrix, to avoid subsequently using instructions that perform multiplication on the compressed input matrix when executing the layer of the NN, wherein the uncompressed data is stored in the cache that is local to the processor;

loading, by the processor, a set of instructions into an instruction cache, wherein the set of instructions relate to non-zero elements of a kernel matrix;

after generating the uncompressed data and loading the set of instructions into the instruction cache, executing, by the processor, the layer of the NN, wherein the executing involves multiplying the kernel matrix by the uncompressed data using the set of instructions; and outputting, by the processor, an output generated by the NN based at least in part on the execution of the layer of the NN.

10. The method of claim 9, wherein the compressed input matrix is compressed using a compressed sparse column (CSC) format.

11. The method of claim 9, wherein the set of instructions do not include instructions relating to zero elements of the kernel matrix.

12. The method of claim 9, comprising repeating the uncompressing and multiplying operations until all sub-blocks of the input matrix have been multiplied.

13. The method of claim 9, wherein the uncompressing and multiplying operations are performed over a series of iterations, the method comprising, prior to the first iteration, uncompressing a buffer of compressed input matrix data.

* * * * *